(12) United States Patent
Lindvall

(10) Patent No.: US 9,456,583 B2
(45) Date of Patent: Oct. 4, 2016

(54) CALF WET-NURSE

(71) Applicant: Tommy Lindvall, Visby (SE)

(72) Inventor: Tommy Lindvall, Visby (SE)

( * ) Notice: Subject to any disclaimer, the term of this patent is extended or adjusted under 35 U.S.C. 154(b) by 0 days.

(21) Appl. No.: 14/406,791

(22) PCT Filed: Jun. 12, 2013

(86) PCT No.: PCT/SE2013/050675
§ 371 (c)(1),
(2) Date: Dec. 10, 2014

(87) PCT Pub. No.: WO2013/187836
PCT Pub. Date: Dec. 19, 2013

(65) Prior Publication Data
US 2015/0150216 A1    Jun. 4, 2015

(30) Foreign Application Priority Data

Jun. 14, 2012  (SE) .................................... 1250626

(51) Int. Cl.
*A01K 9/00* (2006.01)
*A01K 5/00* (2006.01)
*A01K 7/00* (2006.01)

(52) U.S. Cl.
CPC . *A01K 9/00* (2013.01); *A01K 5/00* (2013.01); *A01K 7/00* (2013.01)

(58) Field of Classification Search
CPC ........ A01K 5/0216; A01K 9/00; A01K 5/00; A01K 7/00; B65D 81/3211
USPC ....... 119/51.01, 51.5, 52.1, 53, 53.5, 54, 55, 119/71, 72.5; 206/216, 219, 220, 221, 223, 206/459.1, 527
See application file for complete search history.

(56) References Cited

U.S. PATENT DOCUMENTS

| 1,632,342 A | * | 6/1927 | Lambert | ............. A47J 31/0576 99/315 |
| 2,708,421 A | | 5/1955 | Jauch | |
| 3,037,481 A | | 6/1962 | Kloss | |
| 3,208,431 A | * | 9/1965 | Kloss | ....................... A01K 9/00 119/51.11 |
| 3,473,516 A | | 10/1969 | LeGrain | |

(Continued)

FOREIGN PATENT DOCUMENTS

DE    29913223 U1    12/2000
EP    1 080 636        3/2001

(Continued)

OTHER PUBLICATIONS

International Search Report regarding International Application No. PCT/SE2013/050675, mail date Sep. 13, 2013, 4 pages.

(Continued)

*Primary Examiner* — Kristen C Hayes
*Assistant Examiner* — Ebony Evans
(74) *Attorney, Agent, or Firm* — Foley & Lardner LLP

(57) ABSTRACT

Calf wet-nurse (10) comprising a container (11) provided with at least one supply opening (12) for on one hand dry powder and on the other hand liquid as well as a delivery duct (13) for the distribution of ready-mixed nutrient solution, wherein the container (11) is provided with at least one mixing duct (181, 182) connected to the container (11), at least one medium passage (191, 192, 193, 194) being arranged between the mixing duct (182, 183) and the container (11). The invention also concerns a method for a calf wet-nurse.

18 Claims, 3 Drawing Sheets

(56) References Cited

U.S. PATENT DOCUMENTS

| | | | | |
|---|---|---|---|---|
| 3,524,432 | A * | 8/1970 | Tartar | A01K 9/00 119/51.11 |
| 3,648,662 | A * | 3/1972 | Lines | A01K 9/00 119/71 |
| 3,830,203 | A * | 8/1974 | Murphy | A01K 9/00 119/51.11 |
| 3,874,342 | A * | 4/1975 | Kloss | A01K 9/00 119/71 |
| 4,116,354 | A * | 9/1978 | Kenkare | B01F 13/002 206/219 |
| 4,550,685 | A | 11/1985 | Foerster | |
| 5,551,374 | A | 9/1996 | Wells | |
| 5,711,306 | A * | 1/1998 | Guilluy | A61B 5/097 215/228 |
| 5,975,357 | A * | 11/1999 | Topar | A47J 31/467 222/129.3 |
| 6,022,134 | A * | 2/2000 | Andrews | B01F 13/002 206/221 |
| 6,238,377 | B1 * | 5/2001 | Liu | A61H 35/04 604/289 |
| 6,264,068 | B1 * | 7/2001 | Ours | A47G 19/02 222/129 |
| 6,517,878 | B2 * | 2/2003 | Heczko | A23L 2/00 206/219 |
| 8,292,844 | B1 * | 10/2012 | Diomede | A61M 31/00 604/82 |
| 2010/0011855 | A1 * | 1/2010 | Yip | A01G 25/14 73/426 |
| 2010/0224131 | A1 | 9/2010 | Lee et al. | |

FOREIGN PATENT DOCUMENTS

| | | |
|---|---|---|
| EP | 1080636 A2 | 3/2001 |
| FR | 1505936 | 12/1967 |
| GB | 1295925 A1 | 11/1972 |
| GB | 2 281 185 | 3/1995 |

OTHER PUBLICATIONS

International-Type Search Report regarding Swedish Application No. 1250626-7, mail date Dec. 12, 2012, 6 pages.

Extended European Search Report for EP Application No. 13803766.8, mail date Jan. 15, 2016, 9 pages.

* cited by examiner

CALF WET-NURSE

CROSS-REFERENCE TO RELATED APPLICATIONS

The present Application is a U.S. national stage of and claims priority to and the benefit of International Application No. PCT/SE2013/050675, filed on Jun. 12, 2013, which claims priority to Swedish Application No. 1250626-7, filed on Jun. 14, 2012. Both applications are incorporated herein by reference in their entireties.

TECHNICAL FIELD

The present invention relates to a so-called calf wet-nurse that is intended to allow newborn or young animals, preferably calves, to be fed from. Even if the device is denominated "calf wet-nurse", a feeding device for liquid intake even for other animals than calves is, however, intended.

BACKGROUND OF THE INVENTION

Previously known such calf wet-nurses have delivered ready-mixed nutrient solution to the animals with cleaning problems and growth of bacteria as a consequence. Accordingly, previously existing types of calf wet-nurses demonstrate hygienic problems by the included parts being difficult to maintain on a high level of cleanliness. This is a great problem around the world.

THE OBJECT OF THE INVENTION

The object of the present invention is to provide a calf wet-nurse that promotes a better health for the animal.

The object of the present invention is to provide a calf wet-nurse that allows separate delivery to the calf wet-nurse of nutrients in powder form as well as separate delivery to the calf wet-nurse of liquid.

The object is thus that the mixing of nutrients and liquid should take place in the calf wet-nurse in order to eliminate growth of bacteria earlier in the system.

A further object of the invention is to provide a calf wet-nurse that easily can be replaced and that can consist of disposables.

In addition, the object of the invention is to provide such a calf wet-nurse that in addition can be individually adapted as regards dosage of nutrients.

SUMMARY OF THE INVENTION

By the present invention, as the same is seen in the independent claim, the above-mentioned objects are met, whereby said disadvantages have been eliminated. Suitable embodiments of the invention are defined in the dependent claims.

The invention concerns a calf wet-nurse comprising a container provided with at least one supply opening for on one hand dry powder and on the other hand liquid as well as a delivery duct for the distribution of ready-mixed nutrient solution. The container is provided with at least one mixing duct that is connected to the container and has a medium passage with the container. This medium passage may be arranged along the mixing duct in the form of one or more holes or as an opening at the lower part of the container. Furthermore, the mixing duct may be formed along a side of the container or be disposed around the container. The mixing duct may be directly connected to an air source or may accommodate a separate air duct that is connected to an air source. By this mixing duct with a medium passage, a good mixing of powder and liquid can be made directly in the container, which eliminates cleaning or replacement to only this container.

In one embodiment of the invention, the mixing duct is provided with a medium passage between the mixing duct and the container only at the lower end of the mixing duct. By this location of the medium passage, the aeration is effected at the bottom of the container, which contributes to an improved mixing of powder and liquid.

In one embodiment of the invention, the mixing duct is vertically directed and connects to the side of the container. This embodiment entails a compact and easily formed solution of the mixing function.

In one embodiment of the invention, the mixing duct is connected to an air source that can press in air into the container through the mixing duct and said medium passage to the container. In this embodiment, the connection to the mixing duct is permanent. The embodiment may also embrace a screwed connection to the container.

In one embodiment of the invention, the mixing duct has an upper opening for the introduction of an air duct connected to an air source that can press in air through said medium passage into the container. In this embodiment, the connection to the mixing duct is loosely applied such as an air duct introduced through a slot in the upper end of the mixing duct.

In one embodiment of the invention, two mixing ducts are connected to the container on opposite sides of the same for a symmetrical and simultaneous supply of air at the lower part of the container. This embodiment gives a very uniform and quick mixing of powder and liquid.

In one embodiment of the invention, the calf wet-nurse is formed as a bag of a plastic material in which the mixing duct is integrated by a material weld. The formation of the container part of the calf wet-nurse of a weldable plastic material implies low material costs and thereby the possibility of often replacing included parts. Furthermore, the use of a weldable plastic material contributes to simplifying the manufacture of container and mixing duct/mixing ducts by moulding and welding processes.

In one embodiment of the invention, the container is provided with a distribution valve at its lower part. This valve makes it possible to allow opening only for the animal that has been given permission to eat from just this calf wet-nurse.

In one embodiment of the invention, the outermost end of the delivery duct is provided with a suction nozzle.

In one embodiment of the invention, the suction nozzle is formed as a teat provided with a non-return valve. Also a shut-off plate may be connected to this teat.

In one embodiment of the invention, the calf wet-nurse is connected to a delivery system that is adapted for breeding and comprises powder container, conveying pipe for powder, liquid conduit, and metering devices.

In one embodiment of the invention, the delivery system is formed with a individual record of the nutritional requirement of the respective animal by a record plate on the calf wet-nurse as well as on the animal for matching animal and calf wet-nurse for the correct nutritional requirement.

The invention also concerns a method for a calf wet-nurse, wherein a container in the calf wet-nurse is filled with powder containing nutrients for an animal up to a determined quantity of powder as well as with liquid up to an quantity of liquid corresponding to said quantity of powder so as to obtain a determined final homogeneous viscosity, after which air is pressed into the container, preferably in the lower part of the container, so that powder and liquid are mixed to said viscosity. By adding liquid and powder separately and then mix these ingredients, the desired cleanliness and the absence of bacteria are attained.

In one embodiment of the method, the container is filled with powder before the filling of liquid. The fact that the filling takes place in this order contributes to improving the subsequent mixing of air.

In one embodiment of the method, the liquid is water and the powder is powdered milk. Within the scope of the invention, naturally, another powder than powdered milk may be mixed with water.

In one embodiment of the method, the calf wet-nurse is formed according to any one of the above-mentioned embodiments of the calf wet-nurse.

The function of the calf wet-nurse is given by the following. For the identification of each individual, each calf has its own identity number that can be recorded by a scanner placed either in an animal stall or at a feeding place for free-ranging animals. A permission computer gives a permission to eat to a certain individual a number of times per day. For this identification, there is used a RFID system with a passive tag containing the identity number of each calf, which tag can be scanned at a distance from the calf. Said permission computer gives the calf permission to eat when individually adapted factors, stored in the computer or in the system in other respects, of the identity number in question are fulfilled, wherein a calf wet-nurse comprising a bag is brought into position under a container for powder, wherein the correct quantity of powder is supplied to the bag. Next, the bag with the powder is moved to a tapping point for liquid and the correct quantity of liquid is added. Next, air is pressed into the bag and mixes the liquid with the powder into ready-made product, for instance milk substitute, nutrient solution, or the like. The calf wet-nurse is provided with a distribution valve that opens the bag containing the liquid mix to a delivery duct such as a liquid conduit that is terminated by a suction nozzle, for instance in the form of a teat, and the calf can thereby start drinking.

Hereby, the bag can be replaced often, for instance once per day, and thus it is the design of the bag that represents a major part of the inventive calf wet-nurse.

Since previously existing types of calf wet-nurses have hygienic problems, it is difficult to maintain a high level of cleanliness of the included parts. In the present invention, the parts that need to be cleaned are simply replaced. By the bag being formed in the way indicated, the bag is in addition a part included in the calf wet-nurse in a very cost-effective way.

BRIEF DESCRIPTION OF THE DRAWINGS

Now, the invention will be described in more detail with references in connection with the accompanying drawing figures. The drawing figures show only explanatory sketches intended to facilitate the understanding of the invention.

DESCRIPTION OF THE INVENTION

Figure 1:
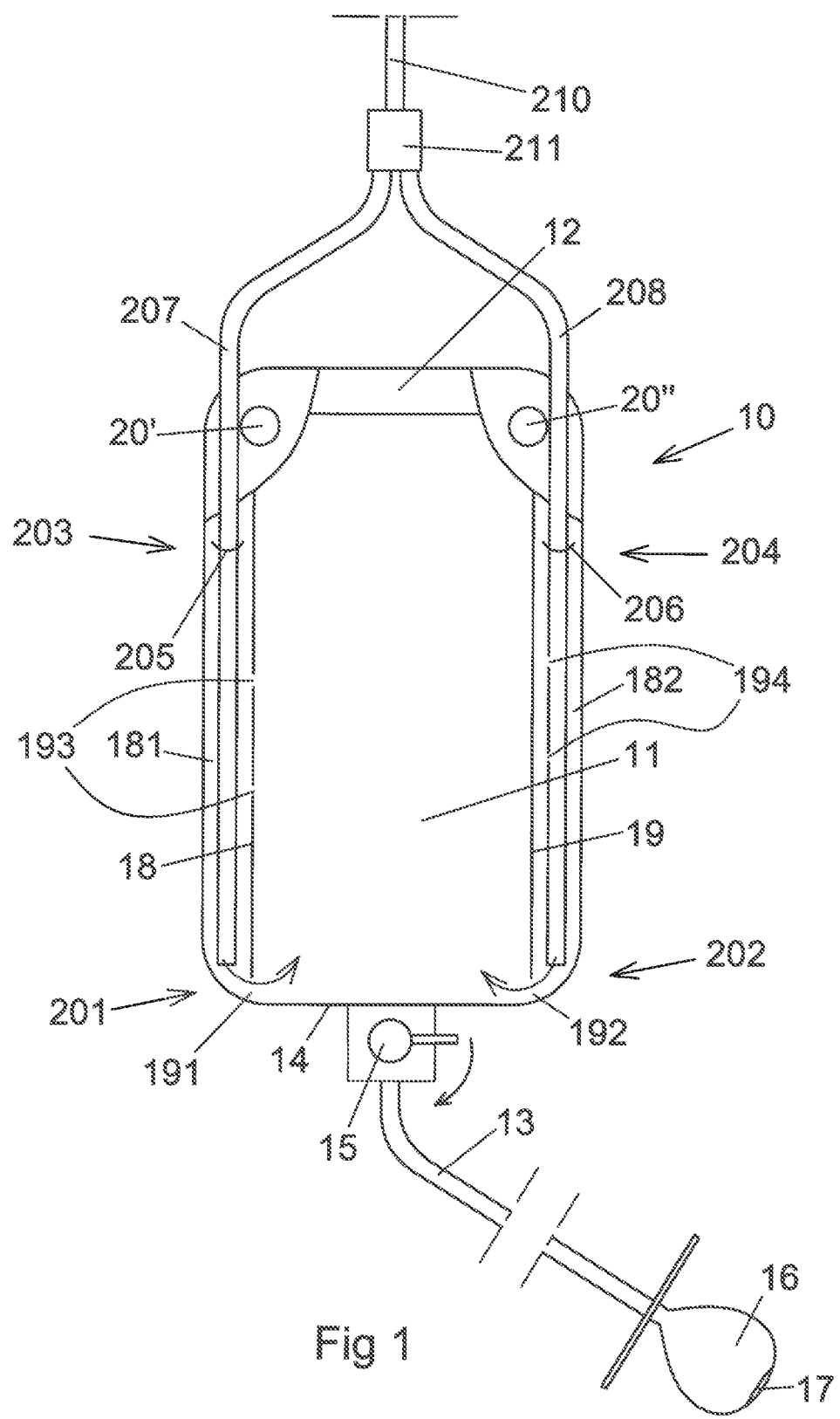
FIG. 1 schematically shows an embodiment of a calf wet-nurse according to the invention.

FIG. 1 shows an embodiment of a calf wet-nurse 10 that comprises a container 11 having a supply opening 12 for nutrient powder as well as for liquid. The container 11 is further provided with a delivery duct 13 for the distribution of ready-mixed nutrient solution. The delivery duct 13 is connected to the lower side 14 of the container 11 via a distribution valve 15 that is opened when the animal should suck ready-mixed nutrient solution via a suction nozzle 16, for instance a teat, connected to the end of the delivery duct 13. The distribution valve 15 can also be shut off in order to prevent leakage from the container 11. The figure shows the distribution valve 15 in the closed position while the open position is indicated by the arrow. The suction nozzle 16 is provided with a non-return valve 17 that prevents leakage from the suction nozzle.

Furthermore, according to the shown embodiment, the calf wet-nurse 10 is provided with two mixing ducts 181, 182 disposed co-laterally in relation to the container 11. Each mixing duct has a medium passage 191, 192 into the container 11 at the lower end 201, 202 of each mixing duct. As indicated in the figure, also other embodiments may be suitable wherein the medium passage from the mixing duct 181, 182 into the container 11 is formed as one or more holes 193, 194 along the mixing duct. Each upper end 203, 204 of the mixing duct is provided with an upper opening 205, 206 through which an air duct 207, 208 is introduced. Each air duct 207, 208 is connected to an air source (not shown) that through a central duct 210 via an air distributor 211 can press in air into the container 11 through the mixing ducts 181, 182 and said medium passage 191, 192 to the container 11 in the direction of the arrows.

The calf wet-nurse 10 is preferably formed as a bag of a plastic material, wherein said mixing ducts can be provided by welds 18, 19 in the material. Furthermore, the bag is provided with holes 20', 20" for the suspension in a conveying system.

Figure 2:
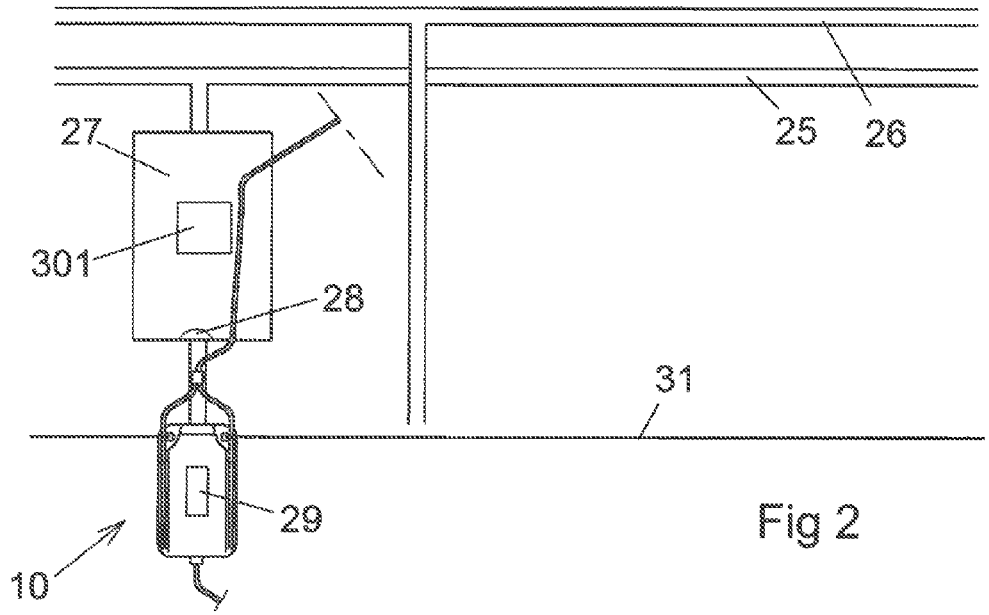
FIG. 2 schematically shows the calf wet-nurse according to FIG. 1 upon the filling of powder.

FIG. 2 shows a part of a conveying system comprising a powder conduit 25 and a liquid conduit 26 in connection with an animal establishment for breeding. The powder conduit 25 is connected to a metering container 27 that is arranged to fill the calf wet-nurse 10 with the correct quantity of powder. The metering container is provided with a metering valve 28 that is controlled for the output of the correct quantity of powder to the calf wet-nurse 10 by an individually adapted record plate 29 on the calf wet-nurse 10 being matched with a first identification unit 301 on the metering container 27, wherein the metering valve 28 with information from the identification unit 301 opens and shuts off for the correct quantity of powder. Alternatively, the metering of powder may be made entirely manually.

As seen in the figure, the calf wet-nurse 10 is slidably suspended on a support cable 31. However, the suspension of the calf wet-nurse 10 may be made in other ways than the one shown, for instance by a hook being attached in the holes in the calf wet-nurse and the entire calf wet-nurse then being hooked-on onto a support cable or support rail.

Figure 3:
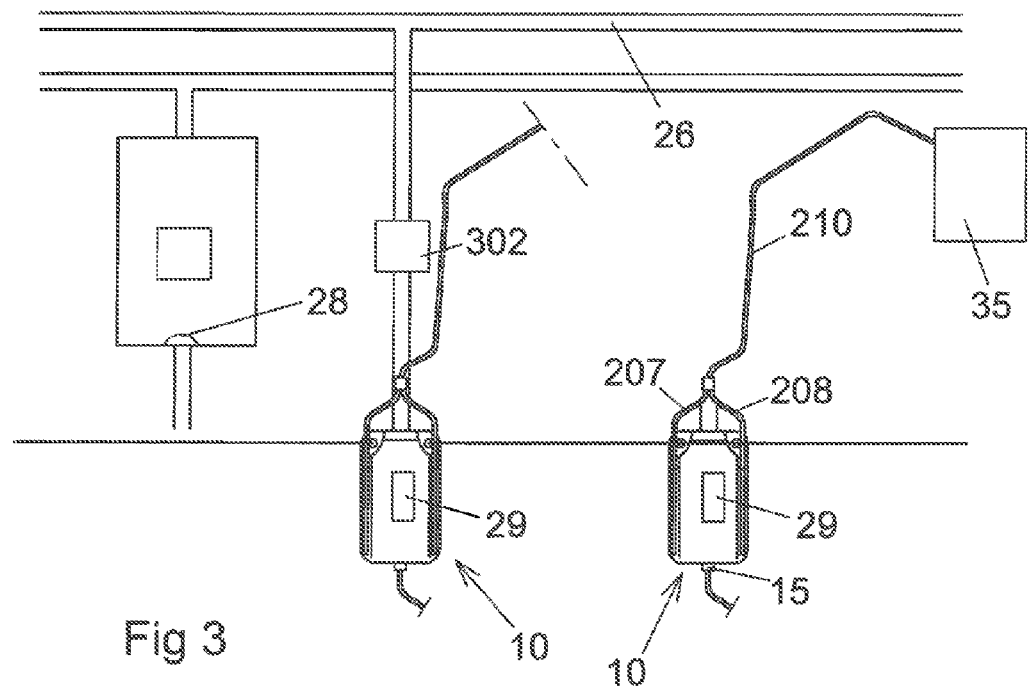
FIG. 3 schematically shows the calf wet-nurse according to FIG. 1 upon the filling of liquid and in an alternative position connected to an air source.

FIG. 3 shows the calf wet-nurse 10 in a second position when this has been filled with powder and then has slid further and placed for the filling of liquid from the liquid conduit 26, which usually contains water. The metering valve 28 has thus been shut off before the calf wet-nurse 10 slides further to the liquid filling. In a corresponding way as upon the powder filling, the individually adapted record plate 29 is matched on the calf wet-nurse 10 with a second identification unit 302 that meters liquid to the powder so that the consistency becomes the correct one considering the quantity of powder.

As further shown in FIGS. 2-3, the calf wet-nurse 10 is connected via the air ducts 207, 208 to the central duct 210, wherein air of a suitable pressure is pressed into the container with powder/liquid by a compressor 35, possibly via a pressure accumulator, so as to mix powder and liquid before the distribution valve 15 of the calf wet-nurse can be opened.

For an opening of the distribution valve 15 of the calf wet-nurse 10, it is required a matching between the record plate 29 of the calf wet-nurse 10 and the individual that the powder mixture is intended for. When this matching fits, the distribution valve is opened and the animal can suck from the calf wet-nurse.

The identification and matching described above between powder filling, liquid filling, calf wet-nurse, and individual are monitored and controlled by a permission computer. This permission computer gives the animal permission to eat when individually adapted factors stored in the system of the animal, i.e., of a specific identity number, are fulfilled.

Figure 4:
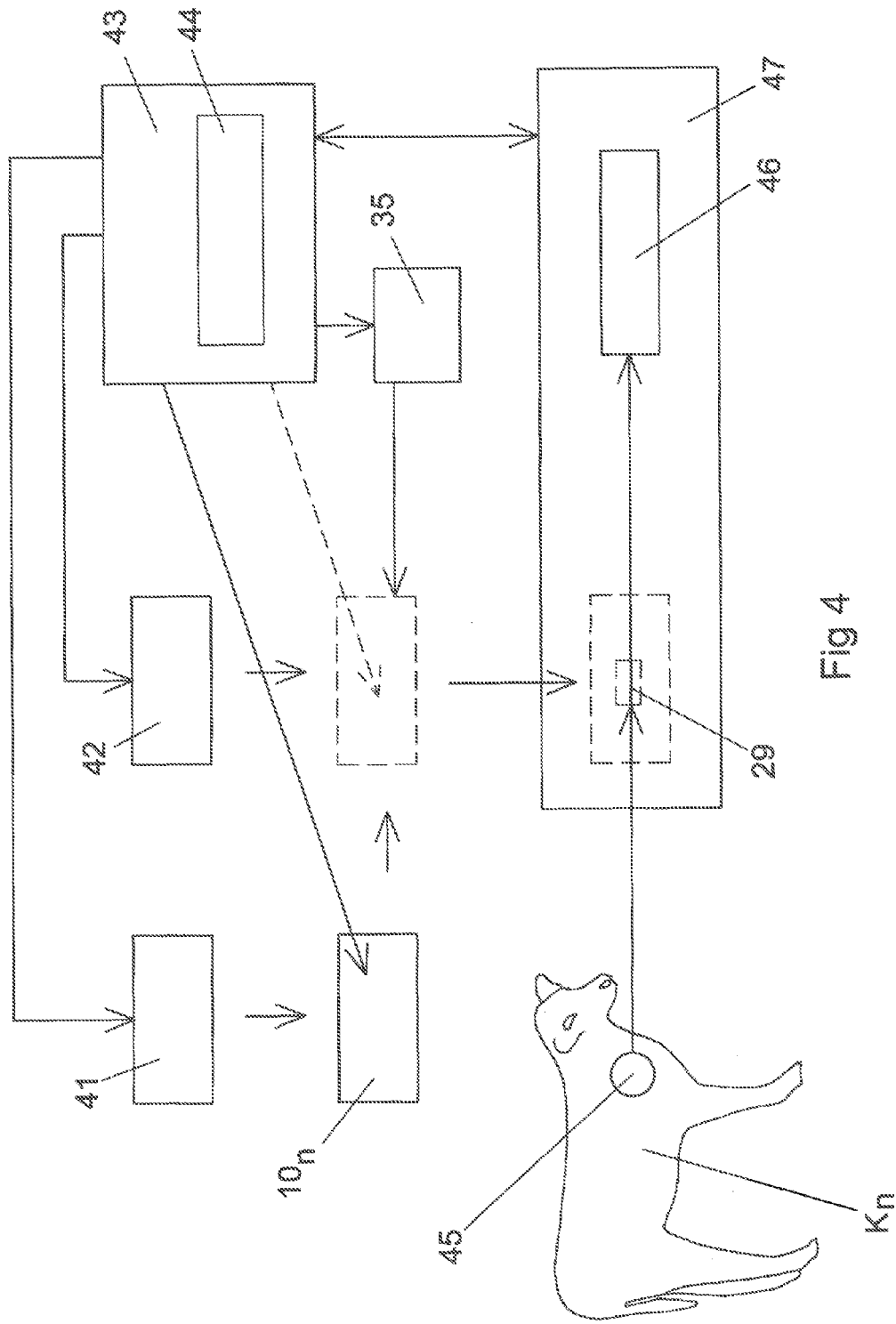
FIG. 4 shows signal flows in an automatized process according to the invention.

FIG. 4 shows signal flows in a possible automatized process according to the invention. According to the figure, the powder discharge system 41 and the liquid discharge system 42 are controlled from a central computer 43. In the central computer, there is an individual memory 44 wherein individual specific information such as individual number, quantity of powder for an individual number, quantity of liquid for an individual number, time between two consecutive permissions to eat for an individual number are stored. On each individual "$K_n$", there is a tag 45 containing the individual's number "n", which tag can be scanned by a scanner 46 situated in an animal stall 47 or at a feed site for freely moving individuals. This tag 45 is preferably placed at the neck or in the ear of the individual. The scanning is matched with data of the individual stored in the individual memory 44, and upon correspondence between individual number and correct time, the central computer 43 gives a control impulse to a calf wet-nurse $10_n$ to be placed at the powder discharge system 41. Powder discharge occurs with the feed that is stored for the current individual number "n" in the individual memory 44. After discharge of powder, the calf wet-nurse $10_n$ is moved to the position for liquid filling, marked by the line in the figure, where the correct quantity of liquid for the quantity of powder is filled in the calf wet-nurse $10_n$. Next, the central computer 43 controls the compressor 35, or the air supply from the compressor 35, for aeration for a determined time that corresponds to the quantity of powder and liquid in the calf wet-nurse. After the mixing, the calf wet-nurse is brought to the animal stall 47 for nutrient intake. Or alternatively to the feed site, so that the metering valve of the calf wet-nurse should be activatable if the record plate 29 of the calf wet-nurse matches the individual's tag 45, and nutrient intake can then take place. The metering of powder and/or liquid may be controlled by either a time window or by a flow meter. Naturally, the central computer 43 may be programmed in a proper way in order to, among other things, add, change, or delete individual specific information out from the individual memory 44. An alternative embodiment is that the calf wet-nurse is brought to the feeding site in order to be mixed with air thereon.

The metering valve may either be opened when an individual's calf wet-nurse is ready-mixed and then be transported to the individual's animal stall, or the ready-mixed calf wet-nurse may be transported to an eating location, and there the metering valve is opened if the correct individual is recognized by the record plate of the calf wet-nurse.

In spite of the described, automatized filling and mixing process, a manual handling of filling, mixing, and distribution is a primary handling of the invention.

As an alternative to the embodiment shown in FIGS. 2-3, the calf wet-nurse may be suspended so that it can be turned between the position for the powder filling and the position for the liquid filling.

The present invention is essentially adapted to animals placed in stalls but would also be possible to be used for free-ranging animals by a suitable adaptation of the identification system indicated above.

The invention claimed is:

1. A calf wet-nurse comprising:
   a container containing nutrients for an animal including a determined quantity of powder and a determined quantity of liquid corresponding to the determined quantity of powder, the container provided with at least one supply opening for at least one of dry powder and liquid, and a delivery duct for the distribution of a ready-mixed nutrient solution,
   wherein the container is hanging and provided with at least one mixing duct that is connected to the container, the at least one mixing duct arranged to press air into the container to mix the determined quantity of power and the determined quantity of liquid to a determined final homogenous viscosity to form the ready-mixed nutrient solution, and that the at least one mixing duct is vertically directed and connects to a side of the container,
   wherein at least one passage is arranged between the at least one mixing duct and the container, so as to obtain a mixing of powder and liquid directly in the container, and
   wherein a portion of the calf wet-nurse is formed as a bag of a plastic material in which the at least one mixing duct is integrated by a material weld.

2. The calf wet-nurse according to claim 1, wherein the at least one mixing duct is provided with the at least one passage between the at least one mixing duct and the container only at a lower end of the at least one mixing duct.

3. The calf wet-nurse according to claim 1, wherein the at least one mixing duct is connected to an air source that presses the air into the container through the at least one mixing duct and the at least one passage to the container.

4. The calf wet-nurse according to claim 1, wherein the at least one mixing duct has an upper opening for an introduction of an air duct connected to an air source that presses air through the at least one passage into the container.

5. The calf wet-nurse according to claim 1, wherein two mixing ducts are connected to the container on opposite sides of the container for a symmetrical and simultaneous supply of air at a lower part of the container.

6. The calf wet-nurse according to claim 1, wherein the container, at a lower side, is provided with a distribution valve.

7. The calf wet-nurse according to claim 1, wherein an outermost end of the delivery duct is provided with a suction nozzle.

8. The calf wet-nurse according to claim 7, wherein the suction nozzle is formed as a teat provided with a non-return valve.

9. The calf wet-nurse according to claim 1, wherein the calf wet-nurse is connected to a delivery system that comprises a powder container, conveying pipe for powder, liquid conduit, and a metering device.

10. The calf wet-nurse according to claim 9, wherein the delivery system is provided with an individual record on the calf wet-nurse as well as on the animal for matching the animal and the calf wet-nurse for a correct nutritional requirement.

11. A method for a calf wet-nurse, comprising:
   filling a container in the calf wet-nurse with powder containing nutrients for an animal up to a determined quantity of powder as well as with liquid up to a quantity of liquid corresponding to said quantity of powder,
   after which, pressing air into the container so that the powder and liquid are mixed to a determined final homogeneous viscosity to form a ready-mixed nutrient solution,
   wherein the container is provided with at least one supply opening for at least one of dry powder and liquid, and a delivery duct for distribution of the ready-mixed nutrient solution,
   wherein the container is hanging and provided with at least one mixing duct that is connected to the container, and that the at least one mixing duct is vertically directed and connected to a side of the container,
   wherein at least one passage is arranged between the at least one mixing duct and the container, so as to obtain the mixing of powder and liquid directly in the container, and
   wherein a portion of the calf wet-nurse is formed as a bag of a plastic material in which the at least one mixing duct is integrated by a material weld.

12. The method according to claim 11, wherein the container is filled with powder before the filling of liquid.

13. The method according to claim 11, wherein the liquid is water and the powder is powdered milk.

14. The method according to claim 11, wherein the at least one mixing duct is provided with the at least one passage between the at least one mixing duct and the container only at a lower end of the at least one mixing duct.

15. The method according to claim 11, wherein the at least one mixing duct is connected to an air source that presses air into the container through the at least one mixing duct and the at least one passage to the container.

16. The method according to claim 11, wherein the at least one mixing duct has an upper opening for an introduction of an air duct connected to an air source that presses air through the at least one passage into the container.

17. The method according to claim 11, wherein two mixing ducts are connected to the container on opposite sides of the container for a symmetrical and simultaneous supply of air at a lower part of the container.

18. The method according to claim 11, wherein the container, at a lower side, is provided with a distribution valve.

* * * * *